United States Patent [19]

Tryhorn

[11] 4,092,957

[45] June 6, 1978

[54] COMPRESSION IGNITION INTERNAL COMBUSTION ENGINE

[75] Inventor: Donald Wilfred Tryhorn, Slough, England

[73] Assignee: Sir W. G. Armstrong Whitworth & Co. (Engineers) Ltd., Slough, England

[21] Appl. No.: 622,602

[22] Filed: Oct. 15, 1975

[30] Foreign Application Priority Data

Oct. 16, 1974 United Kingdom ............... 44869/74

[51] Int. Cl.² ............................................. F02B 75/04
[52] U.S. Cl. .................................. 123/48 B; 123/78 F
[58] Field of Search ................. 123/48 B, 48 R, 51 B, 123/78 R, 78 F

[56] References Cited

U.S. PATENT DOCUMENTS

| | | | |
|---|---|---|---|
| 680,237 | 8/1901 | Eudelin | 123/48 B |
| 1,443,719 | 1/1923 | Schott | 123/48 B |
| 2,079,156 | 5/1937 | Danckwortt | 123/48 B |
| 2,142,466 | 1/1939 | Wagner | 123/48 B |
| 2,305,310 | 12/1942 | Hellweg | 123/48 B |
| 2,332,618 | 10/1943 | Wagner et al. | 123/48 B |
| 2,357,031 | 8/1944 | Stabler | 123/48 B |
| 2,398,640 | 4/1946 | Hickey | 123/48 B |

*Primary Examiner*—Charles J. Myhre
*Assistant Examiner*—Ira S. Lazarus
*Attorney, Agent, or Firm*—Marn & Jangarathis

[57] ABSTRACT

A compression ignition engine has two opposed pistons acting in each cylinder. The pistons are connected to a crankshaft via a rocker beam, and the fulcrum of the rocker beam is at one of its ends so that when the piston is at inner dead center, the little end of the crankshaft/rocker beam connecting rod is at its closest position to the crankshaft axis. The position of the fulcrum is also adjustable, while the pistons are in motion, to alter the engine's compression ratio.

5 Claims, 5 Drawing Figures

COMPRESSION IGNITION INTERNAL COMBUSTION ENGINE

The invention relates to compression ignition engines of the opposed piston type wherein each piston is connected to a crankshaft by a linkage system including a rocker beam and has been devised with the object of making this type of engine suitable for applications where ease of starting, low vibration and low noise characteristics are required, particularly in the small sizes, to make such an engine competitive with spark ignition engine.

Because of its lower fuel consumption and reduced atmospheric pollution there is a requirement for compression ignition (Diesel Cycle) engines to replace spark ignition (Otto Cycle) engines. It has however not proved possible to reduce the size of the normal four stroke cycle Diesel engine much below one litre per cylinder without incurring the penalty of poor starting and rough running particularly when there are less than six cylinders. Efficient running with smaller sizes requires a pre-combustion chamber and this with its starting aids makes the starting procedure slow. The use of a pre-combustion chamber also reduces the fuel saving advantage of the Diesel engine over the Otto engine. Accepting these features takes the size down to about half a liter per cylinder at which size the six cyliner engine is too large and the four cylinder engine too poorly balanced to compete with the popular sizes of Otto cycle engines.

The major problem is to obtain rapid air flow in the combustion chamber couple with a high charge temperature. For this reason a so-called uniflow opposed piston arrangement is favored. With the liner ports set for a high rate of air swirl an open chamber combustion system can be used. Such a system also has low heat losses during starting and a better fuel consuption than is possible by use of a pre-combustion chamber. In addition, with an opposed piston type engine, not only is there no cylinder head cooling loss but also two pistons share the same combustion chamber thereby making it a practical size. A single combustion to drive two pistons is acceptable because the pistons have an almost perfectly balanced motion and in three cylinder form this type has been shown to give very smooth running in sizes as low as one third of a liter per cylinder which is one sixth of a liter per piston.

In accordance with the invention therefore, a compression ignition engine of the opposed piston type in which reciprocatory piston motion is converted into rotary motion of a shaft by way of a rocker beam and a crank is characterized in that the fulcrum of the rocker beam is situated on one side of both the piston and crank connections to the rocker beam, and the position of the fulcrum is adjustable to vary the compression ratio of the engine.

Thus a high ratio can be used to obtain ignition temperature from cold when starting and the ratio lowered when running to give an optimum combustion chamber shape and low peak cylinder pressure. It is a feature of this type of rocker than the fulcrum load is relatively low so easing the problem of adjusting the position thereof.

It is known that a piston connected by a connecting rod directly to a crank shaft moves relatively more slowly the closer the little end of the connecting rod and piston are to the crank shaft axis. In a conventional engine, the pistons are a maximum distance from the crank shaft at top dead center, and therefore they move faster when approaching and leaving top dead center than they do when approaching and leaving bottom dead center. However, in the engine of the invention which has the rocker beam fulcrum in the position specified, the little end of the connecting rod is closer to the crank shaft axis at inner dead center than at outer dead center. This therefore reverses the situation found in the conventional engine and since the piston approaches inner dead center more slowly, there is more time for combustion. This improves both starting and increases the top speed and gives more complete combustion within the normal running speed. When the piston motion of the present engine is plotted against crank angle, the resulting curve differs from a sine curve in that the piston moves more slowly at i.d.c. and more quickly at o.d.c.

The engine may thus be said to be characterized in that the piston motion deviates from a sine curve in the opposite sense to the deviation given by the normal crank and connecting rod.

In order to reduce vibration and noise by reduction of loading on the main frame, the piston motion may be transferred to the crankshaft by a pair of rocker beams for each cylinder. One rocker beam has a single connecting rod and the opposing beam has two connecting rods which are connected to the crankshaft, one either side of the single crank, to give rotary motion without major forces on the main bearings. This also permits the fulcrum points of the rocker beams to be in line and parallel with the cylinder axis so that the fulcrum load is taken by a strut without bending load along the length of the engine.

Thus, the engine may further be characterized in that of each pair of pistons one drives a connecting rod and crank in line with its own axis and the other drives to connecting rods and two cranks symmetrically disposed about its axis.

To achieve symmetry with a single rocker beam on each side, requires that the bearing centers of the outer two of the three cranks are close together and this is done by having large diameter journals with a small crank throw so that the overlap is such that crank webs are not necessary. The small throw required for this results from having the rocker fulcrums on the side of the connecting rod remote from the pistons. This arrangement of the journals satisfies the above characterizing clause in that the connecting rod is at what would normally be the outer dead center position when the piston is at inner dead center and so has the slower motion normally associated with that position.

The engine may also be characterized in that the crankshaft has a throw of less than half the piston stroke.

The engine may also be characterized in that the crank pins join directly without crank webs.

The rocker system described gives a leverage ratio such that the crank loads are greater than the piston loads; however these are absorbed within each set of three coupled cranks and are not excessive because a low compression ratio is used at high outputs.

A particular and at present embodiment of a compression ignition engine in accordance with the invention is hereinafter described, by way of example, with reference to the accompanying drawings in which.

Figure 1:
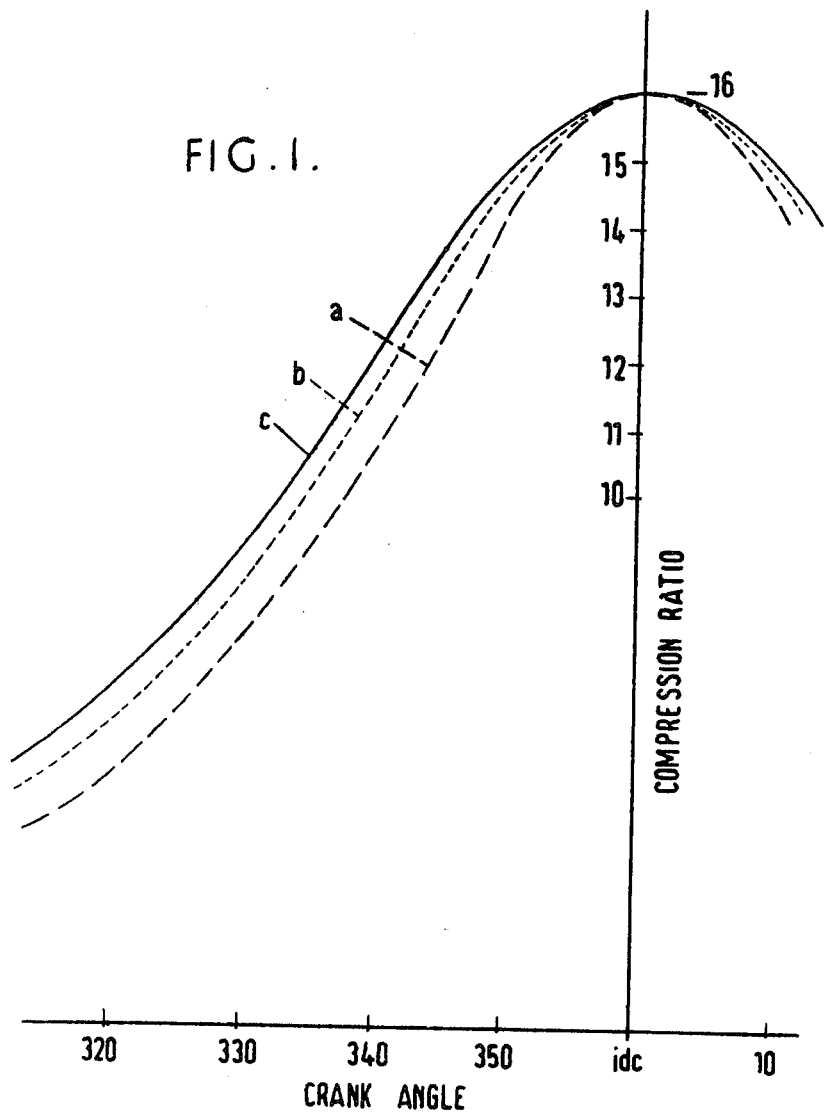
FIG. 1 is a graph which compares the piston motion of an engine according to the invention with simple harmonic motion and with that of a conventional crankshaft with a connecting rod length of four times the crank radius, the comparison being made in terms of the compression ratio reached against crank angle.
Figure 2A:
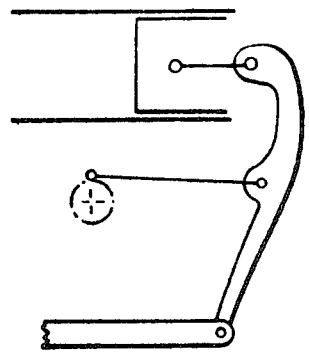
FIG. 2 shows two methods of obtaining the desired piston motion.
Figure 2B:
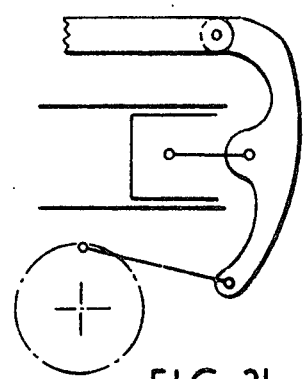

It is known that because of the finite length of the rod connecting a piston to a crankshaft, the motion of a piston, when plotted against crank angle differs from the simple harmonic motion curve (b) in that the piston speed is relatively lower when the little end of the connecting rod is close to the crankshaft than when it is remote from it. The graph of FIG. 1 shows at (a) a curve for a conventional arrangement where the compression ratio increases slower from bottom dead center than that predicted by the S.H.M. curve, curve (b). Curve (c) shows the corresponding motion of a piston in an arrangement as shown in FIG. 2. Here, the compression ratio increases from bottom or outer dead center more quickly than predicted by the S.H.M. curve during the compression stroke. Due to faster compression, the charge temperature is also increased. At any given crank angle the curves are calculated for a compression ratio of 16 to 1. The theoretical charge temperature is approximately proportional to the compression ratio and with the known crank system curve (a) shows that the compression ratio capable of giving a particular ignition temperature is reached later in the stroke than with the S.H.M. of curve (b) and so less time is available for combustion. This is the reverse of what is desirable for a small high speed engine in which combustion time becomes a critical factor in determining the running speed. It is possible to reverse the crank motion as shown in FIG. 2 and obtain a longer period for combustion as shown by the curve (c) of FIG. 1. This longer crank angle available for combustion permits the engine to be run at a higher speed and also during starting it copes with the longer ignition delay period which exists during cold starting, and which with the conventional crank either results in starting failure or lack of speed control on no load.

Of the arrangements for achieving a slot piston speed around inner dead center the one illustrated in FIG. 2 2(a) can be made to offer greater reductions in engine noise and vibration and will be described in detail as one example of how the invention can be applied, by reference to FIGS. 3 and 4. Referring now the those figures there is shown an opposed piston engine with a cylinder 1, an injector 2, an air inlet port 3 and an exhaust port 4.

One piston 5 has a piston rod 6 which swings a rocker beam 7 about a fulcrum 8 to oscillate a connecting rod 9 and turn a crank 10. A similar linkage 11, 12, 13, 14 transfers the motion of the other piston to a crank 16 which lies to the side of the crank 10 and both are of such a diameter that the area of overlap is sufficient to take the crankshaft stresses without need for a crank web. A further crank 17 and connecting rod 15 on the other side of the crank 10 balances the loads on the rocker beams 12 and with the connecting rod 14 balances the load from the connecting rod 9 so that main bearings 22 of the crankshaft do not carry the major forces of combustion pressure. The respective fulcrums 8 and 13 of the rocker beams 7 and 12 are coupled by a thrust member 18 which is shown broken at one end to expose the fulcrum bearing 8 mounted eccentrically on a pin 19 supported in the member 18 and which may be turned to alter the separation of the pistons and thereby the engine compression ratio. An eccentric pin 20 controls the fulcrum rocker beam 12 and may be turned directly with the pin 19 or alternatively may be controlled separately to give variation of port timing. Variation in exhaust lead period could also be achieved by moving the beam sideways but in one preferred form this is rigid and attached to a longitudinal beam system 21 which extends the length of the engine and gives the main frame strength in bending. Other devices, for example turnbuckles or an hydraulic piston, may be used to change the fulcrum positions if desired within the invention. It is a feature of the invention that the fulcrum load is less than that of a known form of engine, as disclosed in British patent specification No. 278339 in which the fulcrum lies between the connecting rod and the piston, and thus facilitates control of its position.

Additional balancing is obtained by adding a weight 23 to a crank web situated between an outer crank — e.g., 16 and an adjacent main shaft journal.

Figure 3:
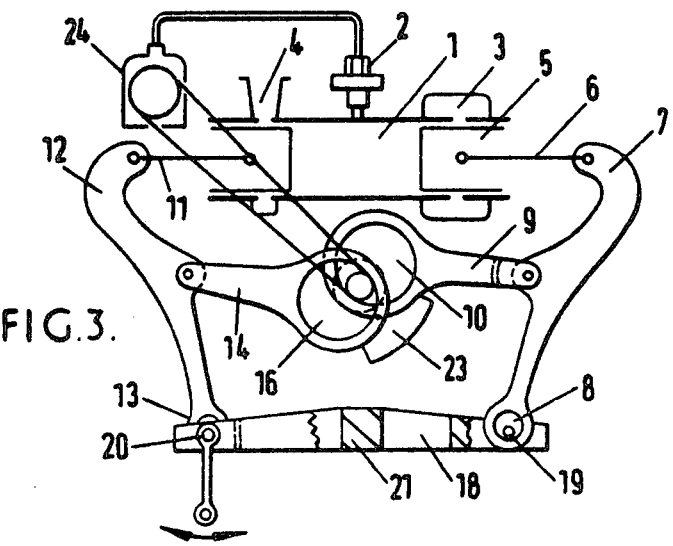
FIG. 3 shows diagrammatically a basic arrangement of the components associated with one cylinder.
Figure 4:
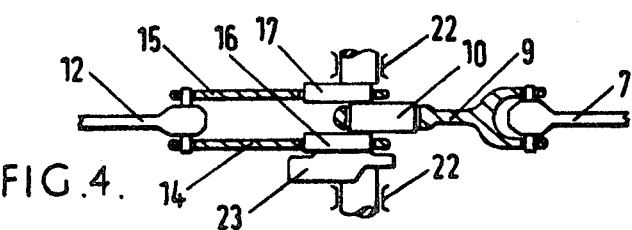
FIG. 4 shows a section through FIG. 3 showing the balanced arrangement of rocker beams and cranks.

The fuel injection pump 24 is of known type and is shown in FIG. 3 as a distributor pump running at half crankshaft speed. It may be coupled internally to give two injections per pump revolution to the injector 2 so that the engine runs as a two stroke cycle engine, but it is within the scope of the invention to run the pump, so that it gives one injection per injector per pump revolution and so fires the charge on alternate crank revolutions. This four stroke running is of particular advantage when running the engine with an exhaust gas turbocharger which has the natural characteristic of delivering the charge air at high pressure but at a rate of less than one cylinder volume per revolution of the engine at high rates of rotation and when its components are matched to give a good engine torque curve. In this situation a cooler and more pure charge is obtained by having two scavenge periods per combustion and the thermal loading of the combustion chamber is lower.

The unique combination of the features shown satisfy the requirement of the invention which is to provide a small compression ignition engine with better starting and idling and a high power output coupled with low levels of vibration and noise.

Improved starting is achieved by the use of a piston motion which permits a long delay period to be accepted, coupled with the low heat loss and good swirl which are characteristic of the opposed piston uniflow design. Easy cranking is achieved by use of a low compression ratio when running up to starting speed. When starting speed is reached the compression ratios can then be changed to a value higher than normal to obtain combustion.

Good idling is achieved by the piston motion which permits long delay periods to be accepted because combustion will not stop if the engine races. This is coupled to the advantage of the opposed piston type engine that injector leakage is less important with an injector supplying the combustion chamber of two pistons compared with one.

High peak output is also a feature of the piston motion as it permits a high running speed for a given combustion time, and this is coupled with the natural high output potential of the opposed piston type engine and its suitability for turbocharging particularly when in its variable compression ratio form.

Low vibration and noise go together and result from the main bearings carrying very little load and the balanced thrust on the beam 18. The components and the forces associated with each cylinder are well balanced within themselves so that there are no large bending couples within the engine frame. The pivot pins of the rocker beams are directly opposite so that these do not introduce bending couples within the frame. Because of this balance the main frame can be very light and can support light covers to retain the oil. The use of a longitudinal beam or beams 21 gives the whole engine strength against bending.

I claim:

1. A compression ignition engine having a crankshaft and cylinder means and comprising for each cylinder,
   two opposed pistons reciprocable in each cylinder,
   two rocker beams, one for each piston having fulcrums which are stationary and at ends of the beams and lie on a line parallel to the axis of the respective cylinder,
   piston rods connecting the pistons to their respective rocker beams,
   oppositely positioned cranks directly adjacent to one another on the crankshaft,
   one connecting rod coupling one of said rocker beams to a respective crank,
   connecting rods coupling the opposite rocker beam to respective cranks so that the rods connecting said opposite beam are directly adjacent to and on either side of the rod connecting said one of said beams,
   the engine further comprising means for adjusting the positions of the stationary fulcrums to vary the compression ratio of the engine, and
   fuel inlet means and exhaust means.

2. The engine of claim 1 and wherein the fulcrums are pivoted on pins mounted eccentrically on discs, and the discs can be rotated to vary the positions of the pins while the pistons are in motion.

3. The compression ignition engine as defined in claim 1 wherein a connecting rod associated with a crank has a large diameter journal with a small crank throw wherein said small crank throw is less than half of a distance stroke.

4. The compression ignition engine as defined in claim 1 wherein said piston rod is connected to said rocker beam at an end thereof opposite said stationary fulcrum and wherein said connecting rod is connected at an intermediate point thereof.

5. The compression ignition engine as defined in claim 1 wherein said piston rods are connected to their respective rocker beams at ends thereof opposite said stationary fulcrums and wherein said connecting rods are connected to the rocker beams at intermediate points thereof.

* * * * *